United States Patent [19]

Ragir et al.

[11] Patent Number: 4,466,787

[45] Date of Patent: Aug. 21, 1984

[54] APPARATUS FOR FORMING SUPPORT DEVICE

[75] Inventors: Meyer J. Ragir, 180 E. Pearson, Chicago, Ill. 60611; John M. Bielecki, Chicago, Ill.

[73] Assignee: Meyer J. Ragir, Chicago, Ill.

[21] Appl. No.: 425,863

[22] Filed: Sep. 28, 1982

[51] Int. Cl.³ .............................................. B29F 1/10
[52] U.S. Cl. ............................... 425/122; 425/126 R; 425/298; 425/553; 264/275; 264/257; 264/247
[58] Field of Search ............... 264/163, 247, 252, 257, 264/275, 277, 175; 425/122, 126 R, 298, 553; 74/464, 465

[56] References Cited

U.S. PATENT DOCUMENTS

| 3,324,508 | 6/1967 | Dickinson | 264/275 |
|---|---|---|---|
| 3,743,458 | 7/1973 | Hallauer et al. | 425/122 |
| 3,792,948 | 2/1974 | Martinez | 425/182 |
| 4,025,258 | 5/1977 | Ragir et al. | 425/123 |
| 4,372,736 | 2/1983 | Gooch et al. | 425/149 |

Primary Examiner—Donald E. Czaja
Assistant Examiner—V. Fischbach
Attorney, Agent, or Firm—Dressler, Goldsmith, Shore, Sutker & Milnamow, Ltd.

[57] ABSTRACT

An improved apparatus and method are disclosed for forming molded plastic articles, such as support devices, having wooden or otherwise fibrous backing members bonded thereto. The apparatus includes an injection molding machine within which the molded plastic articles are formed. Continuous strips of backing material are provided, and are drawn through the apparatus by a novel feed roller mechanism which is intermittently operated in synchronization with the cyclical operation of the injection molding machine. A punch and die mechanism associated with the molding die assembly of the injection molding machine severs discrete backing members from the continuous strip of material, and thereafter advances the severed backing members to a portion of the periphery of the one or more molding cavities defined by the molding die assembly of the machine. The use of continuous strips of backing material intermittently advanced through the apparatus has been found to greatly facilitate efficient formation of the backed molded articles by eliminating problems heretofore associated with formation of the backing members from individual discrete strips of fibrous material, and by permitting extended operation of the apparatus without replenishment of the supply of backing material.

8 Claims, 12 Drawing Figures

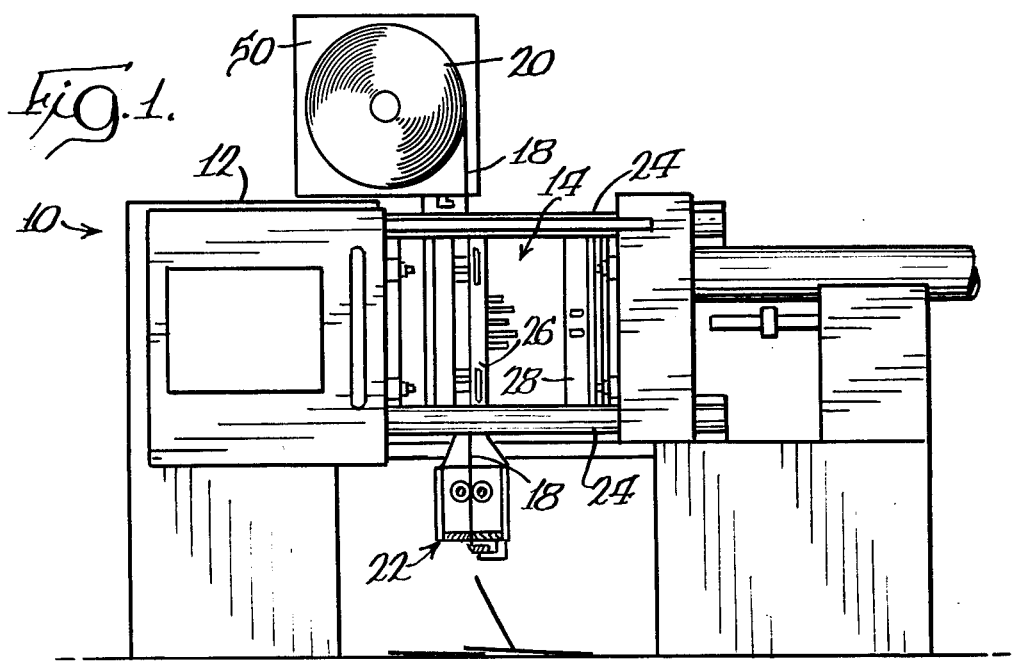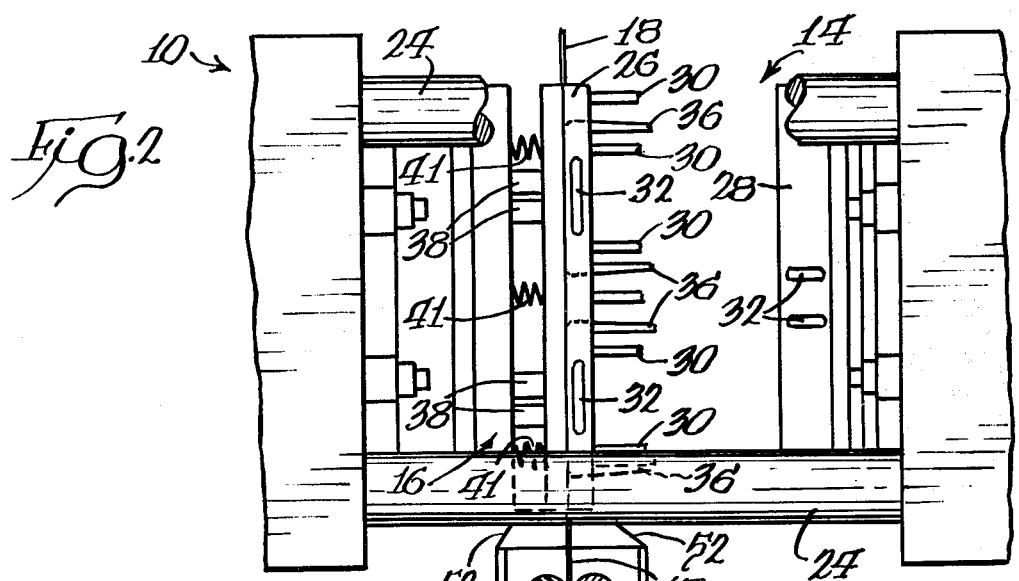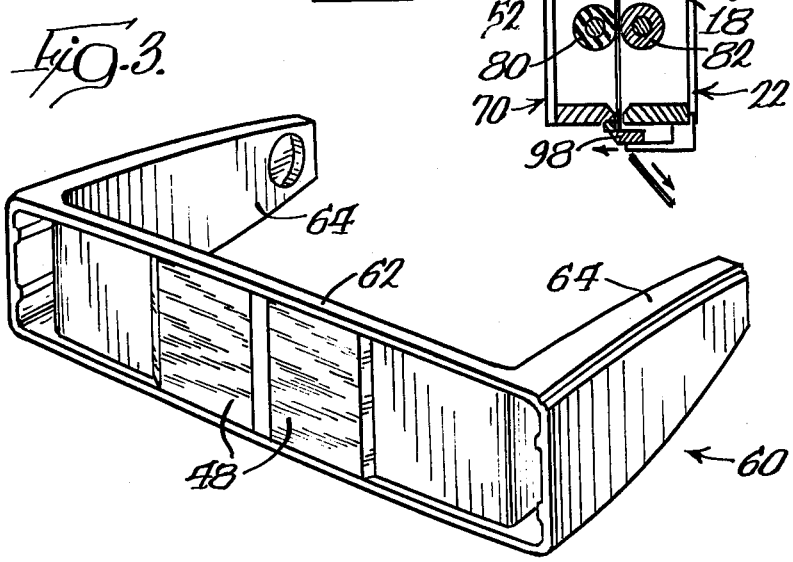

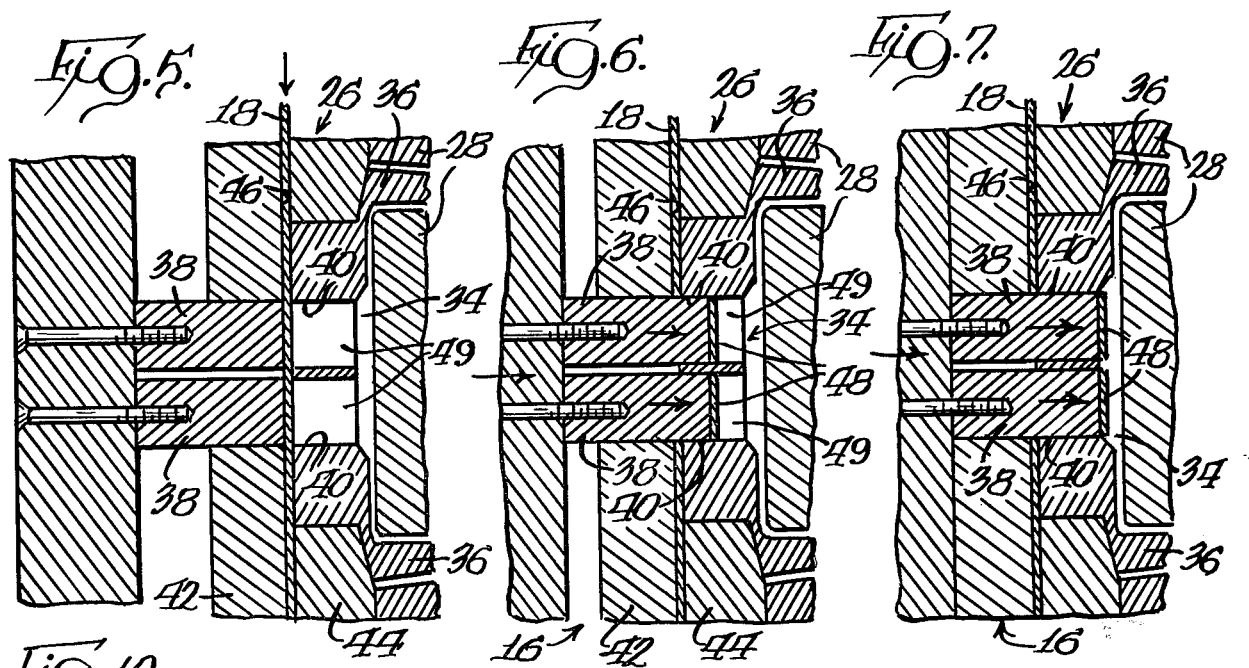
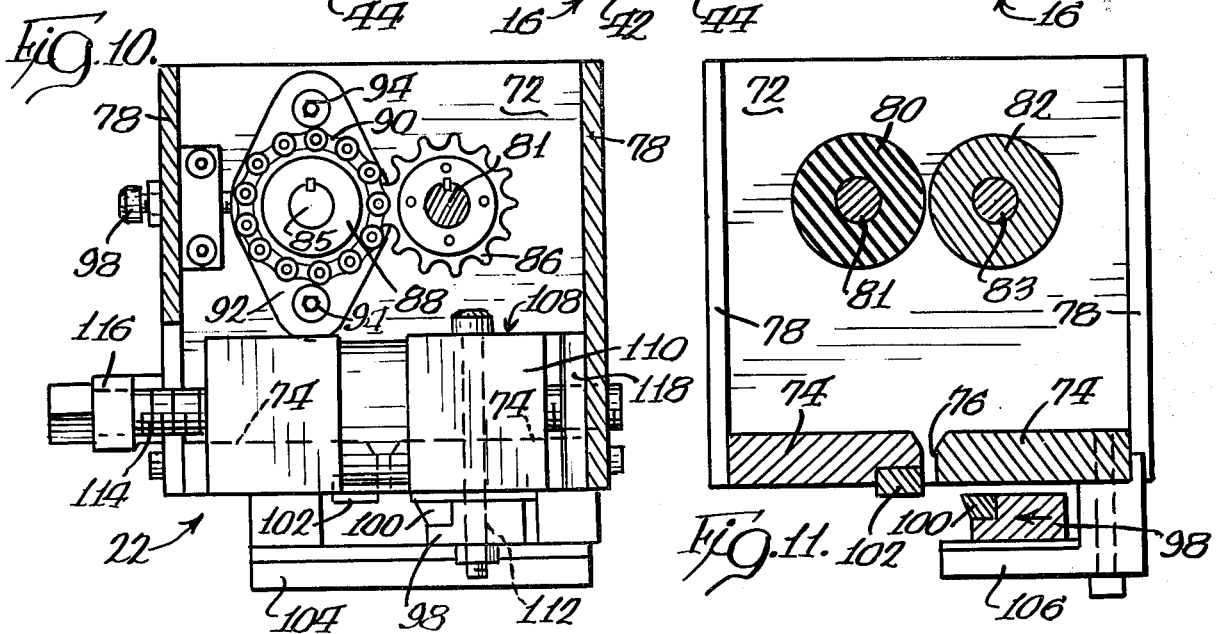
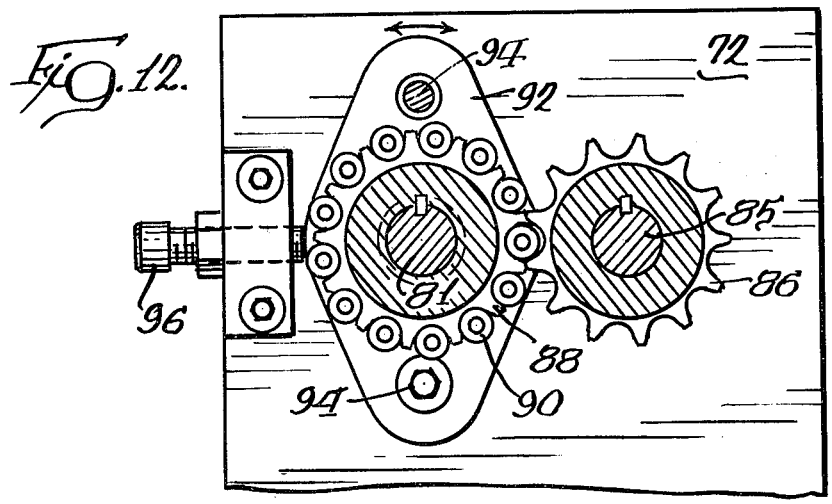

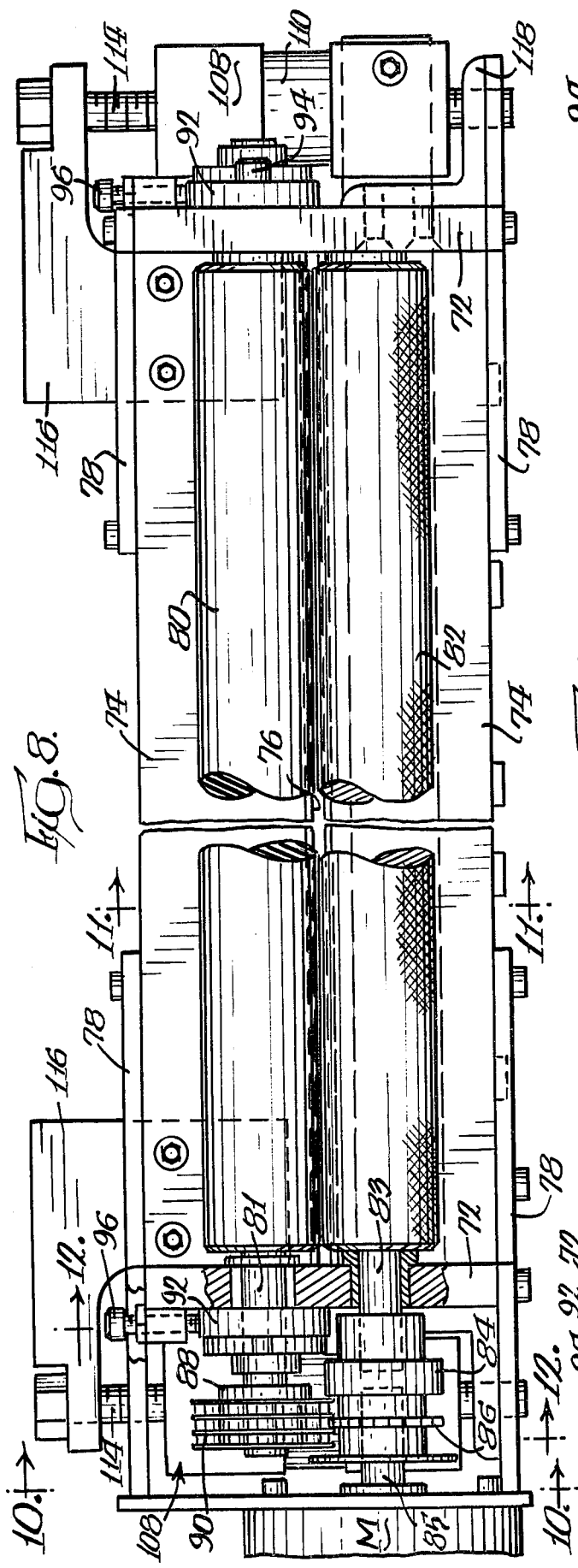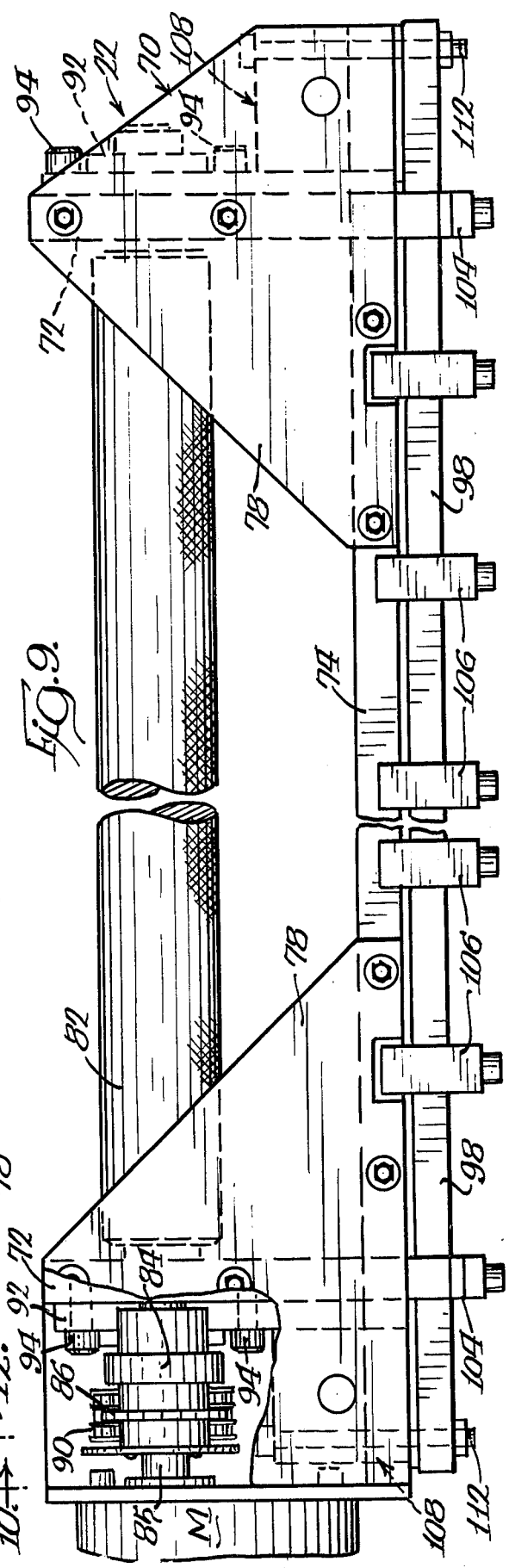

APPARATUS FOR FORMING SUPPORT DEVICE

TECHNICAL FIELD

The present invention relates generally to an apparatus and method for forming molded plastic articles, and more particularly to an improved apparatus and method for forming a molded plastic article, such as a support device, having a fibrous backing member.

BACKGROUND OF THE INVENTION

Various load-carrying support devices are known which are adapted to be directly mounted to a surface, and thereafter used for supporting articles. These types of devices are available in a wide array of configurations and styles, and have proven to be extremely popular consumer items. One of the features of such support devices which enhances their versatility by permitting secure and stable mounting of the device on many different types of surfaces is the provision of one or more backing members for the device formed of fibrous material such as wood. The provision of such wooden backing members permits the support device to be readily affixed to a surface with suitable adhesive typically provided on the backing member, with the adhesive providing secure and stable mounting of the device. Examples of support devices of this description can be found in U.S. Pat. No. 3,504,878.

In forming support devices of this description, it has heretofore been the practice to position the wooden backing member for the device along the periphery of the mold cavity of a suitable plastic molding machine, and to thereafter fill the mold cavity with plastic so that the plastic bonds to the backing member as the article is formed. An injection molding machine is typically employed for this purpose, with one or more wooden backing members positioned along the periphery of the mold cavity of the machine so that when molten plastic is introduced into the cavity the desired plastic article having the backing member bonded thereto is formed.

U.S. Pat. No. 4,025,258 illustrates and describes an apparatus for forming a support device having a backing member as described above. The apparatus disclosed in this patent has proven to be very commercially successful, and has obviated problems previously encountered with positioning the backing members for the plastic articles within the plastic mold cavity by hand. The apparatus of the above patent discloses a punch and die mechanism which is associated with one of the male and female mold portions of the injection molding machine for automatically cutting a wooden backing member from a piece of wood, and thereafter advancing the severed backing member into position along the periphery of the mold cavity so that it is bonded to the plastic article formed in the desired fashion.

The apparatus of the above patent is adapted to receive discrete strips of wood from which the backing members for the finished products are cut during the operation of the apparatus. The strips of wood are positioned intermediate the punch and cutting edge of the punch and die mechanism of the apparatus for each cycle of the machine, so the wooden backing members are cut and thereafter molded to the plastic article. After each strip of wood has been punched, it is ejected or otherwise removed from the punch and die mechanism, typically by advancement of the next strip of wood into the mechanism.

While this technique for forming molded plastic articles with a wooden backing member has proven to greatly facilitate formation of these types of backed molded articles, the operation of the apparatus is not always completely trouble-free. Because the strips of wood from which the wooden backing members are cut are relatively thin and have precise tolerances, e.g., between 0.03 and 0.04 inch thick, and because the slots through which the backing members pass are also formed to precise tolerances, the strips of wood must be carefully guided and positioned in the mechanism in order to assure smooth operation. Additionally, jamming of the mechanism can sometimes occur when strips of wood fed into the machine are misaligned or have improper thickness. This is particularly true when the apparatus is operated such that a new strip of wood introduced into that mechanism engages a punched-out strip to eject the punched strip from the mechanism. Naturally, any jamming or other problems which result attendant to positioning of the wood strips in the device results in undesirable downtime for the entire apparatus. Additionally, even when automatic loading mechanisms are provided for feeding the discrete strips of wood into the machine, such loading devices usually must be re-supplied with wood strips several times within the space of a work shift, thus resulting in non-productive downtime for the operation.

In view of the foregoing, it is particularly desirable to provide an apparatus and method for forming molded plastic articles, such as support devices, having fibrous backing members which obviates problems heretofore associated with formation of these articles by positioning of individual wooden strips in association with the plastic molding mechanism of the apparatus. Such an arrangement should preferably provide wooden or otherwise fibrous material in a continuous fashion so that downtime of the apparatus can be reduced to a minimum, and should also be arranged to minimize problems of jamming and the like which can occur attendant to feeding of discrete wood strips into the machine.

SUMMARY OF THE INVENTION

In accordance with the present invention, an improved apparatus and method are disclosed for forming molded plastic articles, such as support devices, having wooden or otherwise fibrous backing members. The present invention contemplates the provision of an essentially continuous strip of wooden material which is intermittently drawn into association with the plastic molding mechanism of an injection molding machine. As the continuous strip of material is intermittently fed into the apparatus, a punch and die mechanism severs individual backing members from the strip, and advances the backing members into position along the periphery of the plastic mold cavity of the machine for subsequent bonding to the injection molded plastic articles.

The present apparatus includes an injection molding machine having a molding die assembly including a male mold portion and a female mold portion. The machine includes means for reciprocally relatively moving the male and female mold portions into and out of registry with each other in a cyclical fashion to provide a mold cavity between the mold portions.

The apparatus further includes a punch and die mechanism which is associated with one of the mold portions, specifically the male mold portion in the illustrated embodiment. The punch and die mechanism includes one or more punches which cooperate with respective cutting edges provided by the mechanism. The punch and die mechanism is arranged such that each punch and cutting edge of the mechanism is aligned with the mold cavity defined by the male and female mold portions.

A supply of wooden backing material in the form of an essentially continuous strip is provided on the apparatus, preferably arranged for movement with the mold portion of the injection molding machine with which the punch and die mechanism of the apparatus is associated. The apparatus includes suitable plate-like members which support and align the continuous strip of material between the punch and cutting edge of the punch and die mechanism.

In order to advance the continuous strip of backing material intermittently in synchronization with the cyclical operation of the injection molding machine, the present apparatus includes a feed roller mechanism which is preferably arranged so as to engage the strip of backing material after it has passed through the punch and die mechanism so that the strip is drawn through the apparatus. The feed roller mechanism is preferably mounted for movement with the one of the male and female mold portions with which the punch and die mechanism is associated. In the preferred embodiment, a pair of feed rollers are provided in closely spaced relation to each other so that the continuous strip of backing material is drawn between the two rollers. Preferably, the feed roller mechanism includes means for selectively adjusting the gap between the rollers which in the preferred embodiment comprises an arrangement for altering the rotational axis of one of the rollers with respect to the frame of the feed roller mechanism.

The means provided for moving the male and female mold portions into and out of registry with each other include means for advancing the one or more punches of the punch and die mechanism through the strip of backing material in cooperation with the cutting edges of the punch and die mechanism. In this manner, one or more backing members are severed from the continuous strip, with the one or more punches thereafter advanced towards the mold cavity defined by the male and female mold portions so that the one or more severed backing members are advanced to a portion of the periphery of the mold cavity. The apparatus includes an arrangement for feeding molten plastic material into the mold cavity to injection mold the plastic articles. The molten plastic material fills the mold cavity and adheres the severed backing member, which is positioned along the periphery of the mold cavity, to the molded plastic article during operation. After each cycle of the machine, the one or more punches of the punch and die mechanism are withdrawn so that the punches are moved out of severing cooperation with the cutting edges of the mechanism, and the feed roller mechanism thereafter operated in synchronization with operation of the machine so that the continuous strip of backing material is advanced to present another portion of the strip of material to the punch and die mechanism. The operation cycle of the machine is thereafter continuously repeated.

The feed roller mechanism of the apparatus preferably includes an integral cutting mechanism which cuts the punched-out continuous strip of material after it is drawn through the feed rollers. The punched strips can thereafter be conveniently disposed of.

Numerous other advantages and features of the present invention will become readily apparent from the following detailed description of the invention and the embodiment thereof, from the claims and from the accompanying drawings.

BRIEF DESCRIPTION OF THE DRAWINGS

FIG. 1 is a side elevational diagrammatic view of the apparatus embodying the present invention;

FIG. 2 is an enlarged, side elevational view, in partial cutaway, of the apparatus illustrated in FIG. 1;

FIG. 3 is a rear perspective view of a finished molded plastic support device having wooden backing members bonded thereto;

FIGS. 5–7 are diagrammatic cross-sectional views further illustrating operation of the present apparatus;

FIG. 8 is a top plan view in partial cross-section illustrating the feed roller mechanism of the present apparatus;

FIG. 9 is a front elevational view in partial cutaway further illustrating the feed roller mechanism of the present apparatus;

FIG. 10 is a view taken along lines 10—10 of FIG. 8;

FIG. 11 is a view taken along lines 11—11 of FIG. 8; and

FIG. 12 is a view taken generally along lines 12—12 of FIG. 8.

DETAILED DESCRIPTION

Figure 4:
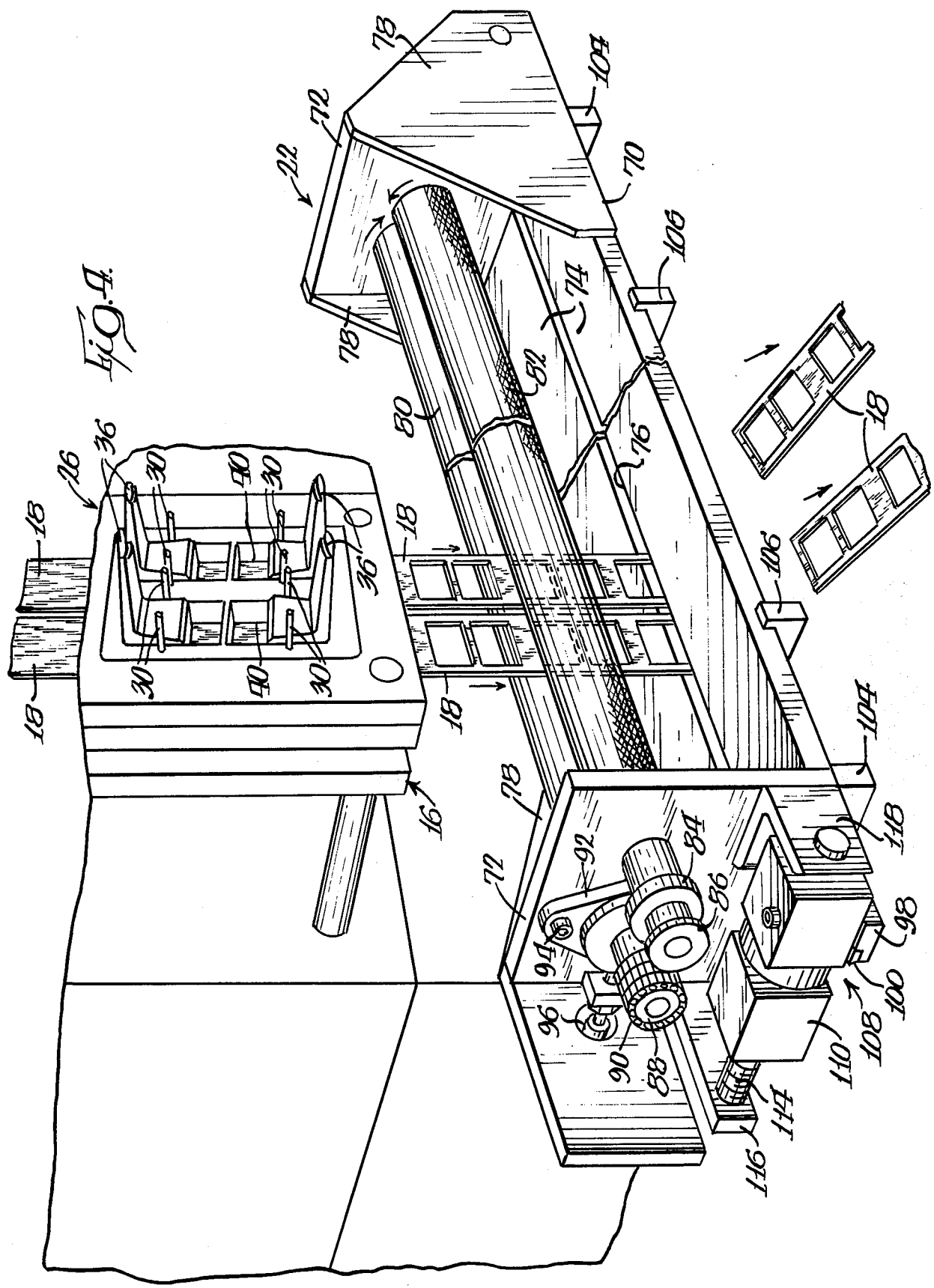
FIG. 4 is a diagrammatic perspective view illustrating the operation of the present apparatus.

While the present invention is susceptible to embodiment in various forms, there is illustrated in the drawings and hereinafter described a presently preferred embodiment, with the understanding that the present disclosure is intended as an exemplification of the invention, and is not intended to limit the invention to the specific embodiment illustrated.

With reference now to FIGS. 1 and 2, and 5–7, the apparatus of the present invention for forming support devices or like molded plastic articles having backing members is illustrated. As shown in FIG. 1, the apparatus includes an injection molding machine 10 having a frame generally designated 12, and a molding die assembly generally designated 14. The construction and operation of injection molding machines such as 10 is known, and will be readily appreciated by those familiar with the art.

The apparatus includes a punch and die mechanism, designated 16, which is associated with one of the mold portions of the molding die assembly. In many respects, the punch and die mechanism 16, as well as other aspects of the present apparatus, are similar to the apparatus disclosed in U.S. Pat. No. 4,025,258. Portions of this patent not inconsistent with the present disclosure are incorporated herein by reference.

In accordance with the present invention, one or more continuous strips 18 of fibrous backing material, preferably wood, are provided for advancement into association with the punch and die mechanism 16 of the present apparatus. Each strip of backing material 18 is preferably provided from a roll 20 mounted in association with molding die assembly 14. A preferred method for formation of the continuous wooden strips 18 is disclosed in co-pending application Ser. No. 425,826, filed Sept. 28, 1982.

The present apparatus further includes a feed roller mechanism, designated 22, which is arranged so as to draw the one or more strips of backing material 18 through the punch and die mechanism 16 of the apparatus. As will be further described, the feed roller mechanism is preferably carried by one of the mold portions of the molding die assembly 14, and includes features which facilitate smooth, intermittent advancement of strips 18 of backing material through punch and die mechanism 16.

The frame 12 of molding machine 10 is provided with suitable slides or track members 24 that guide the advancement of a reciprocably movable male mold die member or portion 26 of molding die assembly 14. Male mold portion 26 is movable into and out of registry with a female mold die member or portion 28 of molding die assembly 14. Advancement and retraction of male mold portion 26 is controlled by any suitable power means (not shown) working in conjunction with conventional sequential control means (not shown). A number of pilot pins 30 project from the face of male mold portion 26 and register with apertures provided in female mold portion 28 to assure proper alignment of the mold portions 26 and 28 when they are brought into registry. Both the male and female mold portions 26 and 28 are provided with suitable fluid conduits 32 which are connected to a source of molten plastic material. The molten plastic material is supplied by suitable means under pressure to fill one or more mold cavities 34 defined by male and female mold portions 26 and 28 during the article forming process. The molding die assembly 14 includes forming projections 36 which project from the face of male mold portion 26, and which are provided for formation of a typical wooden-backed support device, such as illustrated in FIG. 3.

As illustrated in FIG. 2 and FIGS. 5-7, the punch and die mechanism 16 of the apparatus is associated with one of the male and female mold portions 26 and 28, specifically male mold portion 26. The punch and die mechanism 16 includes one or more punches 38 which cooperate with a cutting die 40 having suitable cutting edges. The punch mechanism operates in opposition to compression springs 41 (FIG. 2) during cyclical operation of the apparatus. Movement of the punches into cooperation with the cutting die 40 is provided by the means which relatively move male and female mold portions 26 and 28 into registry with each other.

The article forming apparatus includes support plates 42 and 44 which are arranged in association with punch and die mechanism 16 and male mold portion 26, and which together define the preferably one or more vertically extending feed slots 46 (one being shown). Each feed slot 46 receives a respective continuous strip 18 of wooden backing material so that each strip 18 is supported and aligned, and positioned intermediate punches 38 and cutting die 40 when the punches are in a retracted position.

In operation of the present apparatus, punch and die mechanism 16 is operated in timed relation with the movement of male and female mold portions 26 and 28 into and out of registry with each other. As shown in FIG. 5, male and female mold portions 26 and 28 have been moved into registry with each other so that they together define one of the mold cavities 34. FIG. 6 illustrates advancement of punches 38 through one of the continuous strips 18 of backing material so that severed backing members 48 are cut from the continuous strip by the cooperative action of the punches 38 and the cutting die 40. As noted, the punches 38 are aligned with molding cavity 34 so that the severed backing members 48 are advanced through passage or guides 49 until they are positioned generally as shown in FIG. 7 at a portion of the periphery of molding cavity 34. The molding cavity 34 is then filled with molten plastic material so that the molded plastic article is formed with backing members 48 bonded thereto.

After male and female mold portions 26 are separated so that the molded plastic article can be removed from molding cavity 34, the molding cycle is repeated. Punches 38 are withdrawn from severing cooperation with cutting die 40 so that they are again positioned generally as shown in FIG. 5. The strip 18 of backing material is then advanced by the feed roller mechanism 22 so that another portion of the strip 18 is positioned in alignment between punches 38 and cutting die 40. Because it is desired to control the tension of the strip 18 of backing material, it is preferred that the feed roller mechanism 22 and the roll 20 of backing material are supported for movement with the movable male mold portion 26. Thus, the roll of material 20 is preferably supported within a frame 50 supported for movement with male mold portion 26. Frame 50 may be mounted in a cantilevered fashion such as by an L-shaped track (see FIG. 1) from the movable mold portion 26. Feed roller mechanism 22 is similarly mounted for movement with male mold portion 26, with supports 52 provided for this purpose.

FIG. 3 illustrates the construction of the molded plastic support device 60 such as will be formed by the illustrated embodiment of the present apparatus. The support device includes a body portion 62 from which extend a pair of load carrying hollow arms 64. As will be appreciated, the hollow configuration of arms 64 is provided by forming projections 36 of the molding die assembly. As shown, the rear surface of body 62 includes a pair of wooden backing members 48 which have been severed from the continuous strip of wooden material 18 and bonded to the article during its formation as described above. Notably, the backing members 48 are capable of receiving an adhesive such as a water soluble glue which is readily adaptable for use in mounting and securing the completed support device 60 to a surface such as a wall or door.

The feed roller mechanism 22 of the present apparatus includes many features which facilitate reliable and trouble-free advancement of one or more continuous strips 18 of backing material through the punch and die mechanism 16 of the apparatus. Referring to FIG. 4, and FIGS. 8-12, feed roller mechanism 22 includes a generally elongated frame 70 having spaced apart side frame portions 72, and a pair of spaced apart lower frame portions 74 which together define an elongate opening 76 extending generally along the lower length of the feed roller mechanism 22. The frame 70 may be provided with suitable gusset plates 78 for rigidification of the frame.

It will be noted that in FIG. 4, one of gusset plates 78 is not shown for purposes of clarity. It will also be noted that FIG. 4 illustrates the feed roller mechanism 22 in somewhat enlarged perspective relative to the male mold portion 26 also illustrated in this view (supports 52 not being shown). As is evident from FIG. 4, the number of individual continuous strips of backing material 18 which can be handled by the present apparatus can be selectively varied, with each of the strips 18 passing through a single feed roller mechanism 22. For example, in a typical manufacturing operation, a number of support devices such as 60 may be formed in side-by-side relation to each other, and thus a corresponding number of continuous strips 18 are drawn through the apparatus by intermittent operation of feed roller mechanism 22 in timed relation and synchronization with the injection molding operational cycle of the apparatus.

Feed roller mechanism 22 includes a pair of closely spaced feed rollers between which the one or more strips 18 of backing material are drawn. In the illustrated embodiment, a feed roller 80 supported upon a roller shaft 81, and a feed roller 82 supported upon a roller shaft 83, are rotatably supported by frame 70 for concurrent, opposite rotation. In order to assure the desired engagement of the continuous strips 18 with the feed rollers 80 and 82 as they rotate in unison, one of the feed rollers preferably includes an elastomeric surface, while the other of the feed rollers includes a knurled metal surface. In the illustrated embodiment, feed roller 80 includes an elastomeric surface, while feed roller 82 includes a knurled surface.

As best illustrated in FIG. 8, the roller shafts 81 and 83 of the feed rollers 80 and 82 are supported for rotation by suitable bearings by side frame portions 72 of the frame 70. In order to provide intermittent rotation of the feed rollers, suitable power means are provided, such as electric motor M (not shown in FIG. 4), which is intermittently operated in timed relation with the injection molding cycle of the apparatus. To this end, motor shaft 85 of motor M is connected with roller shaft 83 of roller 82 by a suitable drive coupling 84.

In order to transfer power from the driven roller 82 to the other roller 80, a unique power transmission arrangement is provided. This arrangement comprises a sprocket 86 affixed to motor shaft 85 for rotation with the motor shaft and the roller 82. The power transmission arrangement further comprises a double sprocket 88 affixed to roller shaft 81 of roller 80, the double sprocket 88 including a pair of spaced apart sprocket portions. A link of triple-width roller chain 90 (sometimes referred to as triple-run or triplex roller chain) extends about the double sprocket 88 only so that the outer runs of the roller chain are respectively disposed about the spaced sprocket portions of double sprocket 88. Power transfer from the driven roller 82 to roller 80 is effected by engagement of sprocket 86 with the center run of roller chain 90. This unique power transferring arrangement provides efficient power transfer, while desirably facilitating adjustment of the gap between the feed rollers while maintaining the power transferring association between the rollers.

In order to accommodate adjustment of the gap between the feed rollers, the feed roller mechanism includes an arrangement whereby the rotational axis of one of the feed rollers may be altered with respect to the frame 70. In the illustrated embodiment the rotational axis of the roller 80 may be selectively altered. Roller shaft 81 of the roller 80 is carried by a pair of roller support brackets 92 which are respectively affixed to the opposite side frame portions 72. As best illustrated in FIGS. 10 and 12, each of the roller support brackets 92 is affixed to its respective side frame portion 72 by a pair of fasteners 94. In order to permit selective alteration of the rotational axis of roller 80, the mounting hole for one of the fasteners 94 defined by its respective side frame portion 72 is somewhat oversized (note the enlarged hole for the upper of fasteners 94 illustrated in FIG. 12, the upper fastener 94 being illustrated in cross-section). Thus, by loosening of the fasteners 94 for each of the roller support brackets 92, the roller support brackets can each be pivoted about one of their fasteners 94 so that the gap between rollers 80 and 82 can be selectively varied. In order to assure that the selected position for each roller support bracket 92 is maintained, a pair of releasable locking bolts 96 are respectively provided on the side frame portions 72 so that the desired position of the rotational axis of the roller 80 can be selected and maintained. This unique feature of the present apparatus permits ready adjustment of the feed roller mechanism 22 to assure smooth advancement of the one or more continuous strips 18 of backing material through the apparatus.

As described above, intermittent operation of feed roller mechansim 22 in timed relation to the cyclical operation of injection molding machine 10 intermittently advances the one or more strips 18 of the backing material through the apparatus. As the one or more strips 18 of the backing material are drawn through feed rollers 80 and 82, the strips 18 thereafter pass through the opening 76 defined by lower frame portions 74. So that the punched-out strips 18 can be conveniently disposed of after they have been used, feed roller mechanism 22 preferably includes an integral cutting mechanism for intermittently cutting the continuous strips 18 downstream of punch and die mechanism 16 into relatively small discrete pieces for disposal. This cutting operation is provided by an intermittently movable cutter bar 98 disposed just below one of the lower frame portions 74. Cutter bar 98 has an elongated configuration so that it extends substantially the entire length of the roller mechanism 22. Cutter bar 98 is preferably provided with a serrated cutting edge 100 which is adapted to cooperate with a cutting insert 22 carried by one of the lower frame portions 74 (see FIG. 11). Support of cutter bar 98 is provided by a pair of generally U-shaped support brackets 104 which are respectively aligned generally with side frame portions 22 and extend beneath the cutter bar 98. Support of the cutter bar 98 throughout its length is preferably provided by a plurality of spaced apart, generally L-shaped support brackets 106 which are positioned along the length of the frame 70 and are connected with one of the lower frame portions 74. Support of cutter bar 98 intermediate its end portions by supports 106 is preferred so that there is no tendency for the cutter bar to kink, jam, or otherwise malfunction as it is reciprocably moved.

Intermittent operation of cutter bar 98 is preferably provided by a pair of fluid actuators 108 respectively positioned at opposite ends of the feed roller mechanism 22. Each of actuators 108 preferably comprises a hydraulically operated cylinder and piston arrangement so that cutter bar 98 is actuated to sever the one or more continuous strips 18 after each advancement of the strips by the intermittent operation of feed rollers 80 and 82. In order to desirably conserve the space required for mounting of the actuators 108, these actuators are preferably arranged so that they are "floating" in the sense that the pistons of the actuators are affixed to the frame 70 of the roller mechanism 22, while the cylinders of the actuators are permitted to move and are suitably operatively connected with cutter bar 98. Thus, each cylinder 110 of the actuators 108 is suitably affixed to the cutter bar 98 by a fastener 112, while the piston rod 114 of each actuator 108 is suitably connected to the frame 70 of the roller mechanism 22 by a suitable actuator support 116. Each actuator 108 is further supported upon the frame 70 of the roller mechanism by a suitable actuator support bracket 118.

From the above description of the present article forming apparatus, including the preferred construction of the feed roller mechanism 22 for intermittent advancement of one or more continuous strips 18 of wooden or otherwise fibrous backing material, the operation of the apparatus will be readily appreciated. Feed roller mechanism 22 is operated in synchronization with the cyclical operation of injection molding machine 10 so that the one or more continuous strips 18 of backing material are intermittently advanced through the punch and die mechanisms 16 mounted in association with male mold portion 26. After backing members 48 are severed from the one or more continuous strips 18 and are advanced into position along the peripheries of the one or more molding cavities defined by the molding die assembly 14. The punches 38 are withdrawn from the one or more strips 18, and feed roller mechanism 22 actuated so that the one or more strips 18 are advanced by rotation of feed rollers 80 and 82 to present another portion of each strip 18 to the punches and cutting edges of the punch and die mechanism. After advancement of the strips 18, cutter bar 98 is moved by timed operation of actuators 108 so that discrete portions of the punched-out strips 18 are severed or cut for convenient disposal thereof.

The present apparatus and method have proven to greatly facilitate formation of molded plastic articles having fibrous backing members. The use of a continuous strip of fibrous backing material which is tensioned as it is drawn through the punch and die mechanism 16 has been found to obviate problems heretofore associated with feeding of individual strips of material into the mechanism. Additionally, the continuous strips of material can be provided in relatively large lengths so that the apparatus can be operated for extended periods without replenishment of the supply of backing material. This very desirably reduces downtime for the apparatus, thus enhancing efficient manufacture of these types of articles.

From the foregoing, it will be observed that numerous variations and modifications may be effected without departing from the true spirit and scope of the present invention. It will be understood that no limitation with respect to the specific apparatus illustrated herein is intended or should be inferred. It is, of course, intended to cover by the appended claims all such modifications that fall within the scope of the claims.

What is claimed is:

1. An apparatus for making a molded plastic article having a wooden backing member bonded thereto, comprising:
    an injection molding machine having a molding die assembly including a male mold portion and a female mold portion, and means for relatively moving said male and female mold portions into registry with each other to provide a mold cavity therebetween;
    a punch and die mechanism associated with one of said mold portions, said mechanism including cooperative punch means and cutting edge means aligned with said mold cavity, said cutting edge means being fixed to said one mold portion;
    means for supplying a continuous strip of wooden backing material;
    means for supporting and aligning said continuous strip of material between said punch means and said cutting edge means in juxtaposition to said cutting edge means;
    means for intermittently drawing said strip of material between said punch means and cutting edge means in synchronization with operation of said moving means comprising a pair of rollers supported by a frame between which said strip of material is drawn, and intermittently operable means for cutting said continuous strip of material after movement thereof between said rollers;
    said drawing means being mounted for movement with said one mold portion to maintain said continuous strip of material in juxtaposition to said cutting edge means;
    said moving means including means for advancing said punch means through said strip of material in cooperation with said cutting edge means to sever said backing member from said strip, said punch means being advanced towards said mold cavity to advance said severed backing member to a portion of the periphery of said mold cavity; and
    means for feeding molten plastic material into said mold cavity to fill said cavity to form said molded article and to adhere said severed backing member thereto, said drawing means operating after said punch means is moved out of severing cooperation with said cutting edge means to advance another portion of said strip of material into alignment between said punch means and cutting edge means.

2. The apparatus in accordance with claim 1, including
    means for selectively adjusting the gap between said rollers.

3. The apparatus in accordance with claim 2, wherein
    said gap adjusting means comprises means for selectively altering the rotational axis of one of said rollers with respect to said frame, including means for releasably locking said one roller in its selected position with respect to said frame.

4. The apparatus in accordance with claim 3, and
    means for intermittently driving one of said rollers, and power transmission means for transferring power from said one roller to the other roller so that said rollers are driven in unison, said power transmission means accommodating adjustment of the gap between said rollers while maintaining the power transferring association between said rollers.

5. An apparatus for continuously having a molding die assembly including a male mold portion and a female mold portion adapted to be relatively moved into registry with each other to define a mold cavity, and means for intermittently moving said mold portions in and out of registry;
    a punch and die mechanism associated with one of said mold portions, said mechanism including cooperative punch means and cutting edge means aligned with said mold cavity;
    means for supplying a continuous strip of wooden backing material;
    means positioned adjacent said one mold portion for supporting and aligning said continuous strip of material between said punch means and said cutting edge means;
    means for intermittently drawing said strip of material between said punch means and said cutting edge means in synchronization with the operation of said moving means comprising a frame and a pair of rollers rotatably supported by said frame, said frame being supported by said one mold portion for movement therewith, said strip of material being drawn between said rollers;

said moving means including means for advancing said punch means through said strip material in cooperation with said cutting edge means to sever said backing member from said strip of material and to advance said severed backing member to a portion of the periphery of said mold cavity; and means for feeding molten plastic material into said mold cavity to fill said cavity to form said molded article and to adhere said severed backing member thereto, said rollers being operated after said punch means is moved out of cooperation with said cutting edge means to advance another portion of said strip of material into alignment between said punch means and said cutting edge means, said supporting and aligning means acting to maintain said continuous strip of material adjacent said cutting edge means to facilitate withdrawal of said punch means from said continuous strip.

6. The apparatus in accordance with claim 5, and cutting means mounted on said frame for intermittently cutting said strip of material after it is drawn between said rollers, including a cutter bar supported on said frame and means for intermittently moving said cutter bar.

7. The apparatus in accordance with claim 6, including means for adjusting the gap between said rollers comprising means for altering the rotational axis of one of said rollers with respect to said frame.

8. An apparatus for making a molded plastic article having a wooden backing member bonded thereto, comprising:

an injection molding machine having a mold die assembly including a male mold portion and a female mold portion, and means for relatively moving said male and female mold portions into registry with each other to provide a mold cavity therebetween;

a punch and die mechanism associated with one of said mold portions, said mechanism including cooperative punch means and cutting edge means aligned with said mold cavity;

means for supplying a continuous strip of wooden backing material;

means for supporting and aligning said continuous strip of material between said punch means and said cutting edge means;

means for intermittently drawing said strip of material between said punch means and said cutting edge means in synchronization with operation of said moving means;

said moving means including means for advancing said punch means through said strip of material in cooperation with said cutting edge means to sever said backing member from said strip, said punch means being advanced towards said mold cavity to advance said severed backing member to a portion of the periphery of said mold cavity;

means for feeding molten plastic material into said mold cavity to fill said cavity to form said molded article and to adhere said severed backing member thereto, said drawing means operating after said punch means is moved out of severing cooperation with said cutting edge means to advance another portion of said strip of material into alignment between said punch means and cutting edge means;

said drawing means comprising roller means engaging said strip of material, said roller means being mounted on said one mold portion for movement therewith;

said drawing means further comprising a frame, and said roller means comprising a pair of rollers rotatably supported by said frame between which said strip of material is drawn;

said apparatus including means for selectively adjusting the gap between said rollers comprising means for selectively altering the rotational axis of one of said rollers with respect to said frame, including means for releasably locking said one roller in its selected position with respect to said frame; and means for intermittently driving one of said rollers, and power transmission means for transferring power from said one roller to the other roller so that said rollers are driven in unison, said power transmission means accommodating adjustment of the gap between said rollers while maintaining the power transferring association between said rollers;

said power transmission means comprising a sprocket affixed to said one roller, a pair of spaced apart sprockets affixed to said other roller, and endless triple-width roller chain means extending about said spaced pair of sprockets only with said pair of sprockets respectively disposed within the outer runs of said chain means, said sprocket affixed to said one roller engaging the center run of said chain means for effecting power transfer from said one roller to said other roller.

* * * * *